Patented June 29, 1937

2,085,003

UNITED STATES PATENT OFFICE 2,085,003

PRODUCTION OF ETHYL ALCOHOL FROM ARTICHOKE TUBERS

Leo M. Christensen and Ellis I. Fulmer, Ames, Iowa, assignors to The Chemical Foundation, Incorporated, a corporation of Delaware No Drawing. Application December 14, 1935, Serial No. 54,373

4 Claims. (Cl. 195—37)

This invention relates to the production of ethyl alcohol from the tubers of the Jerusalem artichoke (*Helianthus tuberosus*) by fermentation processes conducted with suitable yeasts, and more especially to a process involving the propagation and application of special strains of such yeasts of augmented potency in the conversion of carbohydrates present in the diffusion liquor or syrup obtained from these tubers, to alcohol.

The objects of the invention are to increase the quantity of alcohol producible by present methods, and to effect such increased production at a decreased cost of operation.

These objects are attained by the present invention, which consists in developing by repeated propagation a yeast of high fermentation capability and its use with the unhydrolyzed diffusion liquor obtained from said tubers, for the conversion of its carbohydrates to alcohol.

The carbohydrates obtained by diffusing artichoke tubers with water at 70° C.–80° C. consist, in part, of levulose and dextrose, but the bulk of the carbohydrate is in the form of polysaccharides which may be hydrolyzed to levulose and dextrose by means of enzymes or with dilute acids.

The yeasts ordinarily used in the fermentation industries are not able to convert all of these polysaccharides to alcohol. Ordinarily only about 75 per cent. of the total carbohydrate content is fermented. If these polysaccharides are hydrolyzed with dilute acids prior to fermentation, 94 to 95 per cent. conversions are obtained with the same yeast.

Hydrolysis, whether obtained by means of acids or enzymes, introduces an added step in processing and therefore increases the cost of operation.

We have found that it is possible to increase markedly the ability of various yeasts to ferment these polysaccharides of the artichoke tuber. The yeasts which have responded best to this treatment are able to convert 92 to 94 per cent. of these carbohydrates to alcohol.

The treatment used consists in repeatedly transferring the yeast in a medium prepared from the solution obtained by diffusing chipped or sliced tubers with warm water, preferably at 70° C. to 80° C. This solution contains ordinarily 12 to 15 per cent. of total solids. For convenience of operation, a large volume of diffusion liquor is usually prepared and concentrated to a syrup, in which form it can be stored, to be diluted and used as required.

The medium, whether made with fresh diffusion liquor or from the syrup, is placed in flasks or tubes, sterilized in the autoclave for about 15 minutes at 100° C. to 120° C., cooled to about 30° C. and inoculated with the desired yeast, using an inoculation ratio of one to ten parts per 100 parts of medium. The flask or tube is then incubated at about 30° C. for two to four days and then used to inoculate another flask of the same medium in a similar manner, observing, of course, the usual precautions to prevent contamination. After about six to eight such cycles, the yeast will be found to have been markedly improved with respect to its ability to ferment the carbohydrates of the artichoke tuber.

We have applied this process to several strains of *Saccharomyces cerevisiae*, but have obtained the best results with the high attenuating Frohberg types. We have also used this treatment, with excellent results, in developing a strain of *Saccharomyces anamensis* and strains of *Schizosaccharomyces pombe* and *Schizosaccharomyces mellacei*.

The term "diffusion liquor" as used in the subjoined claims is intended to comprehend the solution obtained by the diffusion of tubers, either as such or as a dilution of the syrup obtained by concentration.

Having thus described our invention, we claim:

1. The process of producing ethyl alcohol from unhydrolyzed artichoke-tuber diffusion liquor containing unhydrolyzed polysaccharides consisting in successively incubating a suitable yeast culture in a series of separate culture-media containing the polysaccharides of said liquor and continuing such culture propagation until the conversion power of the yeast strain under development becomes capable of fermenting in excess of eighty per cent. of the carbohydrate content of the liquor, and then inoculating the diffusion liquor to be converted with said culture whereby the unhydrolyzed polysaccharides are converted to alcohol.

2. In the process of producing ethyl alcohol from unhydrolyzed artichoke-tuber diffusion liquor which contains unhydrolyzed polysaccharides, the steps constituting the preparation of strains of yeast having markedly high fermentation capacity for the conversion of the polysaccharides of the artichoke-tuber, said steps consisting in inoculating with a yeast a medium containing said polysaccharides; transferring a portion of this culture, after suitable incubation, to a second flask of the same or similar medium; and repeating the cycle until the yeast acquires the ability to convert these polysaccharides to alcohol.

3. The process of producing ethyl alcohol from unhydrolyzed artichoke-tubers containing unhydrolyzed polysaccharides consisting in diffusing the tuber-material with water preferably at 70° to 80° C.; preparing a yeast-culture medium from such solution; inoculating said medium with a suitable yeast, such as the high attenuating Frohberg types; incubating this culture at about 30° C. from two to four days; inoculating a second medium with such culture; repeating this operative cycle from about six to about eight times, and until the yeast strain produced is able to ferment the unhydrolyzed polysaccharides of the said tuber; then adding said strain to the unhydrolyzed artichoke-tuber diffusion liquor in an inoculation ratio of one to ten parts of yeast to one hundred parts of liquor, as may be required by or appropriate to its degree of concentration or dilution.

4. In the process of producing ethyl alcohol from unhydrolyzed artichoke-tuber diffusion liquor containing unhydrolyzed polysaccharides, the steps consisting in inoculating with a strain of *Saccharomyces cerevisiœ*, a culture medium containing the unhydrolyzed polysaccharides of the tuber; transferring a portion of this culture after suitable incubation to a second medium of the same or similar material; and repeating such transfer step until the said yeast acquires the ability to convert the polysaccharides in the diffusion liquor to alcohol and treating artichoke-tuber diffusion liquor with such yeast to produce alcohol therefrom.

LEO M. CHRISTENSEN.
ELLIS I. FULMER.